United States Patent
Sterns et al.

[11] Patent Number: 5,841,394
[45] Date of Patent: Nov. 24, 1998

[54] SELF CALIBRATING RADAR SYSTEM

[75] Inventors: William G. Sterns, Newhall; David M. Cook, Granada Hills; Richard J. Ouwerkerk, Los Angeles, all of Calif.

[73] Assignee: ITT Manufacturing Enterprises, Inc., Wilmington, Del.

[21] Appl. No.: 872,899

[22] Filed: Jun. 11, 1997

[51] Int. Cl.⁶ ............................................. G01S 7/40
[52] U.S. Cl. ............................................. 342/174; 343/786
[58] Field of Search ............................. 342/173, 174; 343/767, 770, 786

[56] References Cited

U.S. PATENT DOCUMENTS

| | | | |
|---|---|---|---|
| 4,538,150 | 8/1985 | Bone, Jr. | 342/174 |
| 5,111,208 | 5/1992 | Lopez | 342/174 |
| 5,563,618 | 10/1996 | Tamura | 343/786 |

*Primary Examiner*—Ian J. Lobo
*Attorney, Agent, or Firm*—Thomas L. Peterson

[57] ABSTRACT

A radar system is described, which includes a built-in calibration/fault detection apparatus that enables rapid and easy calibration of the system. The system includes a long extrusion (70) forming a feed waveguide (90), a calibration waveguide (92), and a base (94) of a horn antenna. A linear array of TR (transmit/receive) units (42) are mounted on the extrusion, with each having a feed probe (100) that receives a feed signal, changes its phase and amplifies it, and delivers it through a monopole (110) to the horn. The calibration waveguide is coupled through holes (130) to the horn, with a calibration pickup (132) mounted at the end of the calibration waveguide. During calibration, one TR unit at a time is energized, and its output is detected by the calibration pickup to check the amplitude and phase of the TR unit.

14 Claims, 4 Drawing Sheets

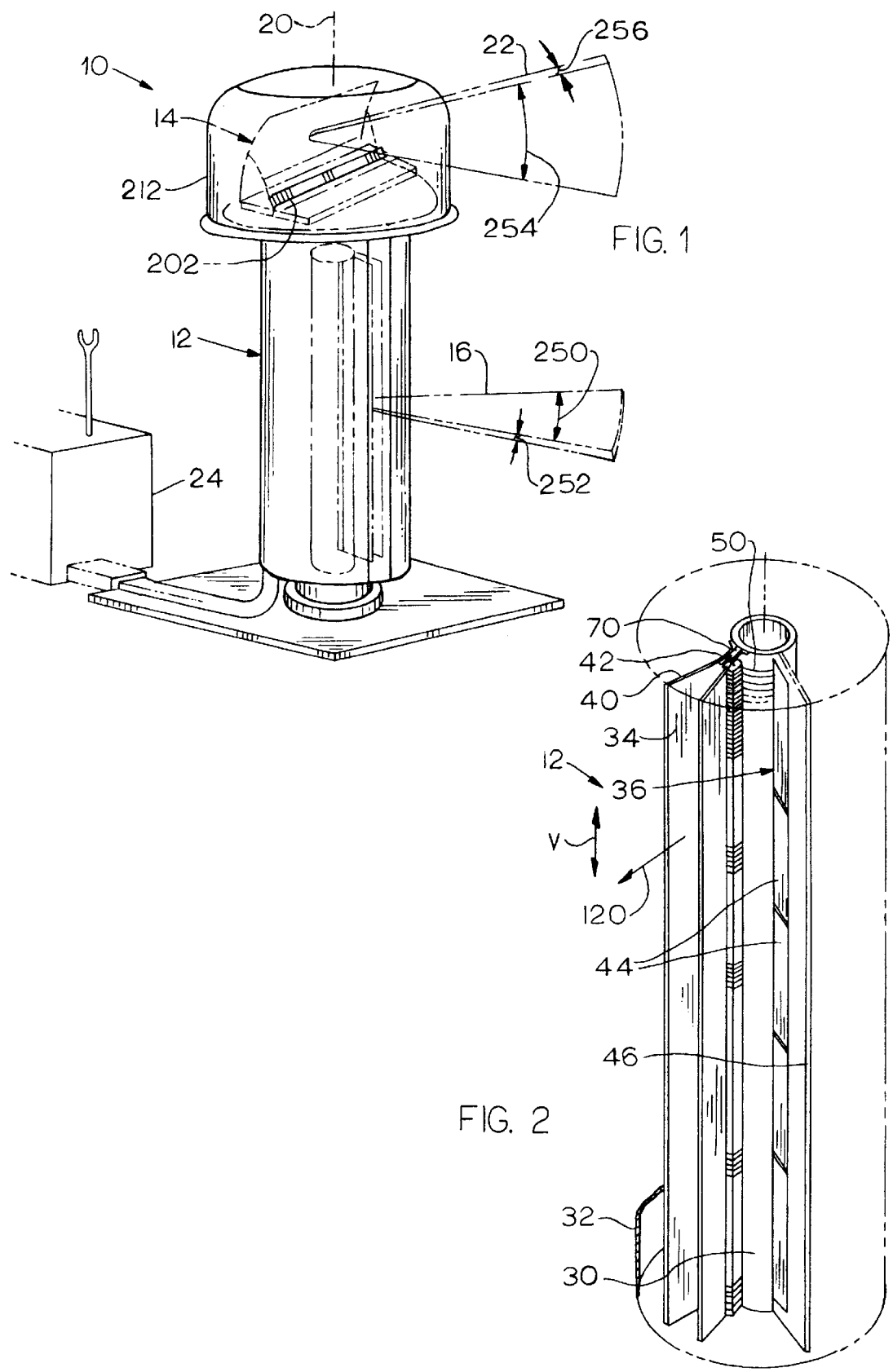

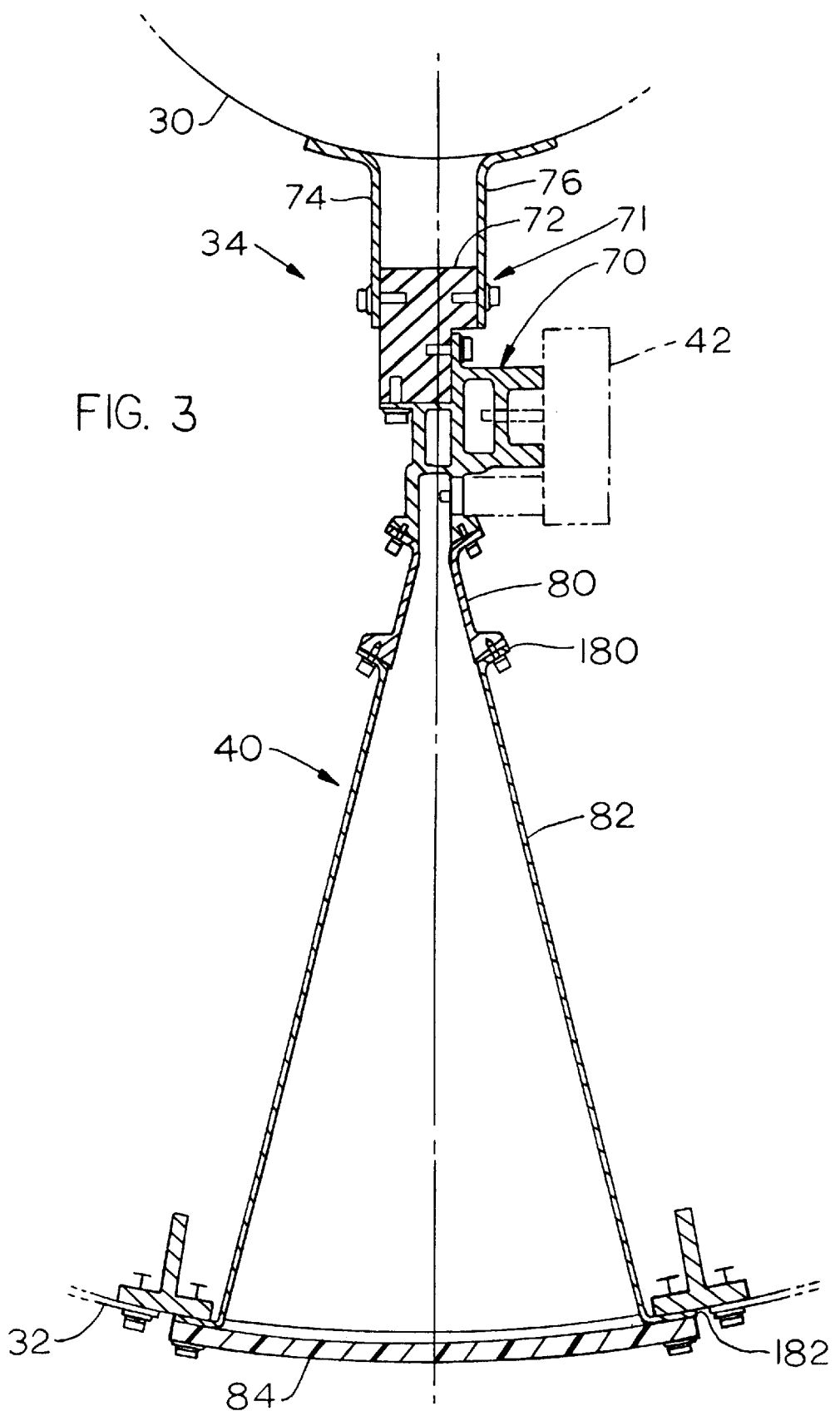

SELF CALIBRATING RADAR SYSTEM

BACKGROUND OF THE INVENTION

Airport radars for small or temporary airports commonly include an elevation radar which detects airplanes approaching or leaving a runway. The radar includes a linear array of TR (transmit/receive) units which change the phase of a feed signal, amplify it, and deliver the amplified signal to a horn. The phases of the TR unit outputs are closely controlled to produce a narrow beam with some radars being able to steer the beam (e.g. direct it at different angles). Proper operation of the TR units has previously been determined by positioning a probe in front of the radar and moving it along the length of the horn to try to determine whether the units are operating properly. However, this has been time consuming and only moderately accurate. A radar system which enabled rapid and accurate evaluation of each of the TR units, to determine whether it was amplifying properly and changing phase as intended, would be of considerable value.

SUMMARY OF THE INVENTION

In accordance with one embodiment of the present invention, a radar system is provided which enables simple and rapid calibration in a relatively simple construction. The radar system includes a long extrusion that includes two waveguides and the base of a horn. TR (transmit/receive) units are mounted on the waveguide, with each unit having a feed probe coupled to a feed waveguide of the extrusion and having a monopole projecting into the base of the horn. A second of the extrusion waveguides is a calibration waveguide that is coupled at numerous locations to the horn. A pickup at the end of the calibration waveguide detects microwaves therein. To calibrate the system, a coherent signal is fed to the feed waveguide and one TR unit at a time is energized with its phase shift controlled, to produce microwaves in the horn. The output of the pickup at the end of the calibration waveguide, is detected. The output of the pickup indicates whether or not the particular TR unit energized is generating sufficient microwave power. The output of the pickup is compared to the signal delivered to the feed waveguide, and the phase shifter of the energized TR unit is controlled, to assure that the desired phase shift at that unit is being produced.

The novel features of the invention are set forth with particularity in the appended claims. The invention will be best understood from the following description when read in conjunction with the accompanying drawings.

BRIEF DESCRIPTION OF THE DRAWINGS

FIG. 1 is an isometric view of a radar system constructed in accordance with the present invention.

FIG. 2 is a partial exploded isometric view of the radar system of FIG. 1.

FIG. 3 is a sectional view of the elevation radar structure of FIG. 2.

DESCRIPTION OF THE PREFERRED EMBODIMENT

Figure 4:
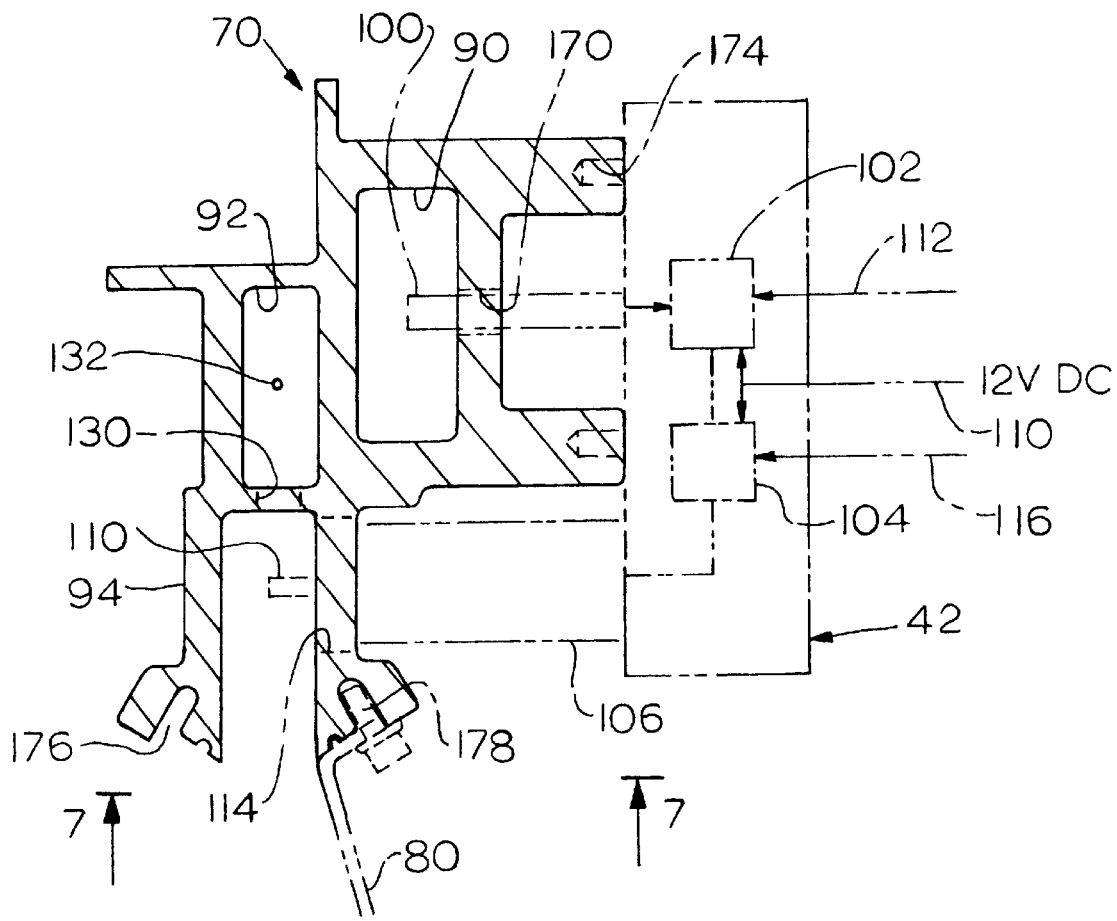
FIG. 4 is an enlarged view of the extrusion of FIG. 3, and showing, in phantom lines, a TR unit connected thereto.

FIG. 1 illustrates a radar system 10 which includes an elevation radar assembly 12 and an azimuth radar assembly 14. The elevation radar assembly 12 is generally stationary and its radar beam 16 is generally directed over a single runway to provide guidance for airplanes approaching the runway. The azimuth radar assembly 14 generally rotates continuously about a vertical axis 20, at a rate such as one revolution per second, so its beam 22 can detect airplanes approaching the airport from any direction. A central control and power station 24 controls the radar assemblies.

FIG. 2 shows that the elevation radar assembly 12 includes a vertical central core column 30, an outer vertical cylindrical cover 32, and modules 34, 36 radiating from the central core column 30 to the cover 32 and mounted on both of them. The first module 34 includes a horn 40 and a linear array of TR (transmit/receive) units 42, the particular arrangement shown including one hundred fifteen of such units spaced vertically along the horn. The second module 36 includes interface circuits, or power and control circuits 44, there being five of such circuits spaced along a frame 46 of the second module. Each of the circuits 44 is connected by cables 50 to twenty-three of the TR units 42.

FIG. 3 shows some details of the elevation radar transmit/receive structure of the elevation radar assembly, or first module 34. The module includes a metal (aluminum) extrusion 70 which holds and couples different radar components including the TR units 42 and the horn 40. The extrusion 70 is held by a mount 71 that includes a coupling 72 and a pair of brackets 74, 76, to the vertical central core 30. The extrusion 70 is also connected through a pair of extruded metal horn middle parts 80 and a pair of formed horn extensions 82 to the outer cylindrical cover 32. It is noted that the cylindrical cover 32 includes primarily sheet metal, but also includes a plastic radome 84 that readily permits the passage of radar microwaves. FIG. 2 shows that the extrusion 70 and the horn 40 formed at least in part by the extrusion, is elongated in a vertical direction V with the horn facing in a second direction 120 that is primarily perpendicular to the vertical direction. It can be seen in FIG. 2 that the extrusion 70 has a length in a vertical direction V which is a plurality of times greater than any horizontal dimension of the extrusion, that is, the vertical dimension is greater than any dimension as seen in a sectional view taken normal to the vertical direction.

FIG. 4 shows some details of the metal (or other electrically conductive) extrusion. The extrusion forms a feed waveguide 90, a calibration waveguide 92, and a horn base 94. During transmission, a signal of predetermined frequency such as 9.1 GHz is transmitted along the feed waveguide, to reach a feed probe 100 of each of the many TR units 42 that are spaced along the extrusion. Each TR unit delivers the signal received from its feed probe 100 to a phase shifter 102 which shifts the phase of the signal by a controlled angle. The output of the phase shifter 102 is delivered to an amplifier 104 which amplifies the signal and delivers it through a filter 106 of the unit to a radiator/detector 110 in the form of a microwave rod or monopole. The monopole 110 forms a microwave output that delivers microwaves to the horn to form a radar beam, and also serves as a pickup to detect a radar reflection. The monopole 110 projects through a horn power hole 114 into the horn. The microwave energy from all of the TR units of the array combine to form a radar beam that is transmitted along the horn. Each TR unit is connected to a power line 110 over which it receives power such as DC current at 12 volts, a phase control line 112 over which it receives signals that adjust the phase shift of the shifter 102, and an amplitude control line 116. A similar operation proceeds during reception of a reflected radar signal, that signal being picked up by the monopoles 110, amplified and phase shifted and delivered to the feed waveguide 90.

Before the radar system is used, each of its radar assemblies should be tested. One test would be to determine which if any of the TR units is not delivering close to the expected level of power to the horn. In one example, each of the TR units is constructed to deliver about four watts of power at 9.1 GHz. If the output drops considerably below that level, then that TR unit should be replaced. Actually, since the particular linear array includes one hundred fifteen TR units, the radar will function satisfactorily so long as no more than several of the TR units are not generating an output.

Figure 7:
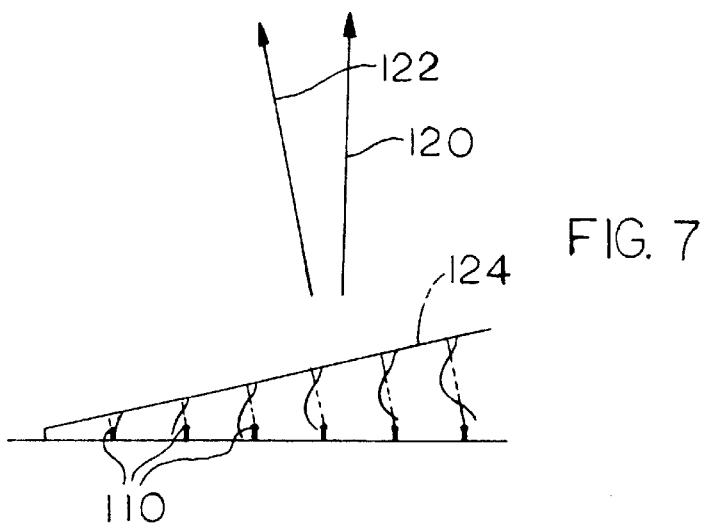
FIG. 7 is a schematic diagram showing how a radar beam is steered.

Another test that is useful is to determine the actual phase shift produced by each TR unit when controlled to produce a predetermined phase shift. FIG. 7 shows a linear array of monopoles 110. If the outputs of all monopoles are in phase, then a beam is generated which moves in a direction 120 that is perpendicular to the length of the array of monopoles. If it is desired to steer the beam so it is directed in another direction 122, this is accomplished by controlling the outputs of the monopoles 110 so their outputs are in phase along a line 124 that is perpendicular to the direction 122 of the beam. This requires that the outputs of all TR units be closely controlled.

Referring again to FIG. 4, it can be seen that the extrusion is constructed so there are pickoff locations in the form of monitor holes 130 extending between the horn base 94 and the calibration waveguide 92. This allows a small portion of power in the horn to pass through the calibration waveguide 92 to a single pickup 132 lying along the calibration waveguide such as at an end of it. When a single TR unit is energized or turned on, the signal sensed by the pickup 132 is a predetermined portion of the output of that TR unit. The signal from the pickup 132 indicates whether or not the TR unit is generating power close to the level that would be expected. The output from the pickup 132 also indicates the phase of the power delivered by the monopole 110 to the horn. Before or during the time when the TR unit picks up a feed signal passing through the feed waveguide 90, a signal delivered over the phase control line 112 can be adjusted to produce a predetermined expected phase shift by the phase shifter 102. Whether the expected phase shift is actually occurring, or the phase shift is greater or less than the expected level (so the control signal must be adjusted to produce the desired shift), can be determined by monitoring the output of the pickup 132.

Figure 6:
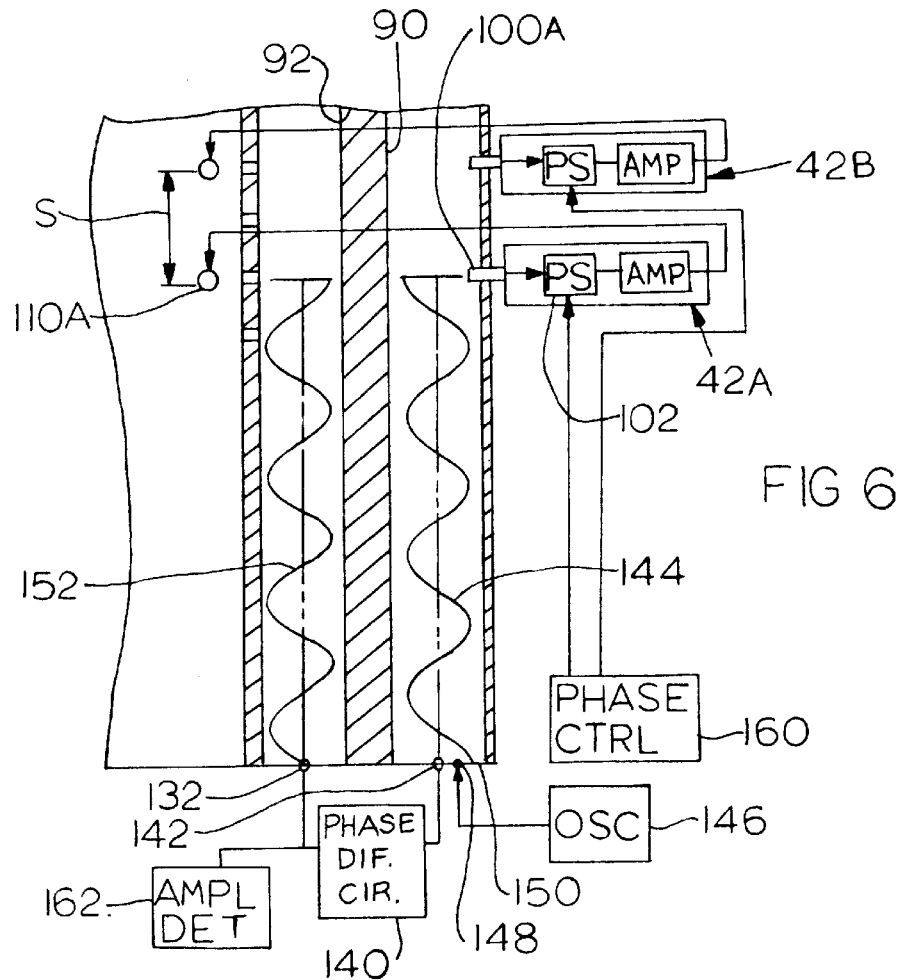
FIG. 6 is a schematic diagram showing the manner in which a TR unit is calibrated.

FIG. 6 indicates one way in which the phase shift produced by a particular TR unit 42A can be determined. A phase difference circuit 140 has one input connected to a pickup 142 that detects a signal 144 that is delivered through transducer 148 to the feed waveguide 90. FIG. 6 shows an oscillator at 146 for generating a feed signal of a frequency such as 9.1 GHz, although other means can be used. The feed signal pickup 142 detects the phase at a particular location along the feed waveguide 90, of the signal generated by the circuit 146. The phase of the signal 144 at any instant, varies with position along the waveguide 90, and the phase shift between the input end 150 and the location of the particular feed probe 100A is known precisely. Even if the phase shifter 102 of TR unit 42A is set to have a zero phase shift, the output at its monopole 110A is usually different from zero. As the calibration signal 152 passes along the calibration waveguide 92, its instantaneous phase changes, and the phase shift between monopole 110A and calibration waveguide 132 is known.

In one example, for a system that applicants designed, it is known that when the phase shifter 102 is at zero, there is a 180° phase shift between the probe 100A and the monopole 110A at 9.1 GHz. The phase shift is 175.6° at 9.0 GHz and is 184.3° at 9.2GHz. Thus, if the phase difference circuit 140 were connected between the probe 100A and monopole 110A, it would register a 180° shift at 9.1GHz. This 180° shift and the shifts in phase along the two waveguides 90, 92 can be accounted for, to determine the net phase shift produced by the phase shifter 102. The phase of the phase shifter 102 can be adjusted by a phase controller 160, until the desired phase shift is achieved. In the designed system, when a second TR unit 42B is operated with its phase shifter producing a zero shift, the phase difference circuit 140 will detect a phase shift that is 217.4° greater than for the adjacent TR unit 42A (when set for zero shift) for operation at 9.1 GHz.

Before the radar system is used, each of the one-hundred fifteen TR units can be calibrated by passing a continuous feed signal 144 along the feed waveguide 90, energizing one of the TR units 42 at a time, and detecting the output for the pickup 132. The amplitude of the output is detected by a circuit portion 162 and the phase of the output is detected by the circuit 140, while the phase control 160 alters the phase. This calibration can be repeated for each of the TR units in the array. For any unit where the expected phase shift is not achieved for a given phase control signal, the phase control signal is changed until the desired phase shift is achieved, and the new phase control signal is noted for later use in steering the radar beam.

Previously, the output of the radar system was calibrated by placing a probe in front of the horn and moving the probe to a precise position relative to one TR unit that was energized, to determine the amplitude and phase of that TR unit. To position the probe relative to each TR unit monopole required the use of a long, flexible, phase stable transmission line to connect the probe to a measuring instrument. Such cables are difficult to obtain. Also, such calibration was not very accurate and took considerable time. Applicant's arrangement which enables calibration without requiring a moving probe or other moving part, enables accurate calibration, and enables the calibration to be accomplished in a relatively short period of time.

Figure 5:
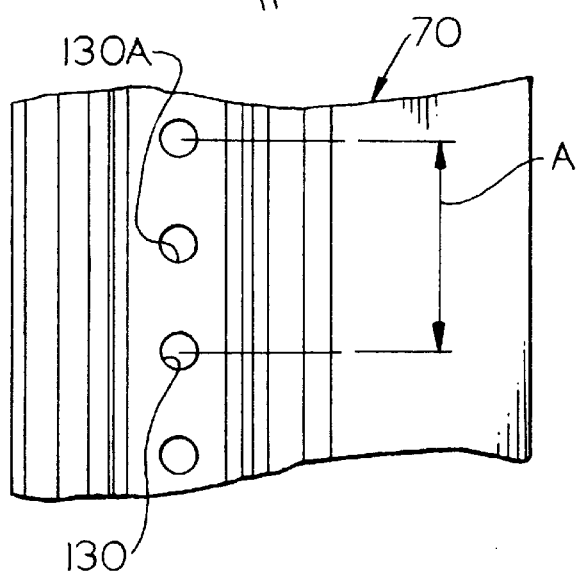
FIG. 5 is a view taken on line 7—7 of FIG. 4.

FIG. 5 shows that monitor holes 130 are spaced along the length of the extrusion 70 by a distance A equal to the spacing of feed holes 170 through which the feed probes 100 project and horn power holes 114 through which the monopoles 110 project. The spacing A is less than the wavelength of the radar signals, such as about 80% of the wavelength, in order to enable steering of the beam without creating large side lobes. The monitor holes include alternate monitor holes 130A which lie between two holes 130 that are spaced at the TR unit spacing A. The extrusion 70 is machined with TR unit mount holes 174 (FIG. 4) to which the TR units are mounted. FIG. 4 shows that the extrusion includes grooves 176 that receive screws 178 that hold the horn middle parts 80. FIG. 3 shows that each of the horn extensions 82 are formed from sheet metal with largely 90° bends 180, 182 or flanges at its ends for mounting respectively on the middle part 80 and on the outer cylindrical cover 32. The same extrusion and calibration method can be used for the azimuth radar assembly 14.

In a radar system that applicant has designed, the vertical extrusion 70 (FIG. 2) had a length of about ten feet and held one-hundred fifteen TR units at a spacing S of 0.96 inch, which is about 75% of the free space wavelength of microwaves at 9.1 GHz. The radar beam 16 (FIG. 1) had a horizontal angle 250 of 30° (where its output dropped more than 3 dB below its center amplitude) and had a vertical angle 252 of one-half degree. The beam 116 could be scanned up and down by 15° by adjusting the relative phases of the TR units. The azimuth radar beam 22 formed a beam having a vertical angle 254 of 30° and a horizontal angle 256 of one degree. The radar assemblies could be calibrated rapidly enough, that they were calibrated every morning before use (in small airports airplane landings usually occur only during the day).

Thus, the invention provides a radar system which is of simple construction and which enables rapid and accurate calibration. An extrusion is formed with a horn base (which may be the entire horn), a feed waveguide, and a calibration waveguide, with TR units attached to the extrusion and coupled to the feed waveguide and horn. The horn base or horn has an inner wall and a pair of side walls, and the calibration waveguide is coupled to the horn through one of the horn walls. A pickup coupled to the calibration waveguide such as at one end, enables detection of the amplitude and phase of each TR unit when each TR unit is individually energized to produce an output in the horn.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A radar system, comprising:
a radar horn which is elongated in a predetermined first direction, and which has an open end facing in a second direction that is primarily perpendicular to said first direction;
a linear array of units having microwave outputs coupled to said horn at horn locations spaced along said first direction;
a calibration waveguide coupled to said horn at a plurality of pickoff locations that are spaced along said first direction;
a pickup coupled to said calibration waveguide, said pickup constructed to indicate at least the amplitude of microwave energy in said calibration waveguide.

2. The radar system described in claim 1 including:
a feed waveguide coupled to said units, with said units each constructed to detect, amplify and phase shift signals in said feed waveguide;
circuit means coupled to said pickup and to said feed waveguide, for generating a signal that indicates the phase difference between signals therein.

3. The system described in claim 1 wherein:
said horn has a horn rear wall and a pair of horn side walls, said calibration waveguide has a waveguide wall that lies adjacent to a first of said horn walls, and said calibration waveguide is coupled to said horn through a plurality of monitor holes that each extends through said calibration waveguide wall and through said first of said horn walls, with each of said monitor holes forming one of said pickoff locations.

4. The system described in claim 3 wherein:
said monitor holes contain substantially only air.

5. The system described in claim 1 wherein:
said horn has a horn base;
said calibration waveguide and said horn base are integral parts of a metal extrusion;
said extrusion forms a row of monitor holes extending between said horn and said calibration waveguide and forming said pickoff locations, and said extrusion forms a row of horn power holes extending into said horn base;
said units each have a conductive microwave rod through which electromagnetic energy is transmitted;
said units are each mounted on said waveguide, with each of said microwave rods projecting through one of said horn power holes into said horn base.

6. The system described in claim 5 wherein:
said extrusion forms a feed waveguide that extends parallel to and is integral with said calibration waveguide, but with said calibration and feed waveguides being isolated from each other;
said extrusion has a row of feed holes opening from said feed waveguide to outside said extrusion;
each of said units has a feed coupling extending through one of said feed holes into said feed waveguide.

7. A radar system comprising:
an elongated electrically conductive extrusion which has walls forming first and second waveguides and walls forming a horn base that comprises a horn recess, said horn recess having an inner end and opposite sides that are each primarily closed and having an outer end that is open, said walls forming said waveguides and said horn inner portion being integral, with each wall forming part of said horn recess;
means for generating a microwave signal and passing it along said first waveguide;
a row of transmit/receive units, or TR units spaced along said extrusion with each unit having a feed coupling that is coupled to said first waveguide and a pole that is coupled to said horn base;
means for coupling said second waveguide and said horn to pass microwaves between them;
a pickup coupled to said second waveguide.

8. Apparatus for use in a radar system, comprising:
an elongated metal extrusion of constant cross-section, which is elongated in a first direction (V) and which includes, in a cross-section taken normal to said first direction, a first primarily rectangular aperture (92) forming a first waveguide that is elongated in said first direction (V), and a horn base (94) with a horn base inner wall and a pair of horn base side walls that open in a direction perpendicular to said first direction, and with a plurality of holes (130) coupling said waveguide to said horn base;
a pair of elongated horn extensions (82) that each has means (80) for fastening to one of said horn base side walls, with each horn extension having a length, as seen in said cross-section, which is longer than said horn base side walls.

9. The apparatus described in claim 8 wherein:
each of said horn extensions includes a cast metal middle part with flanges at its opposite ends, and a sheet of metal which as seen in cross-section, has bent ends that lie facewise against said flanges.

10. A method for testing a radar system that includes an elongated horn that faces in a direction primarily perpendicular to its length, and a linear array of units that can generate microwave energy and that are coupled to horn locations spaced along the length of said horn, comprising:
establishing a calibration waveguide with multiple locations thereof that are coupled to horn locations spaced along the length of said horn;
energizing one of said units at a time to cause it to deliver microwave energy to a corresponding one of said horn locations;

detecting electrical currents at a location in said calibration waveguide.

11. The method described in claim 10 wherein:

said step of detecting includes measuring the amplitude of said electrical currents.

12. The method described in claim 10 wherein:

said step of detecting includes delivering a microwave signal along a feed waveguide to said units, and measuring the difference in phase between said electrical currents and said microwave signal.

13. The method described in claim 10 wherein:

said step of establishing includes forming an extrusion that includes at least a portion of said horn and an integral calibration waveguide, and forming holes in said extrusion to couple said horn and said calibration waveguide at said multiple locations.

14. The method described in claim 10 wherein:

said step of energizing said units includes delivering a coherent continuous microwave signal to each of said units, and controlling said one of said units to vary the phase of the microwave energy that said one of said units delivers to said horn;

said step of detecting includes detecting the phase of said electrical currents with respect to said coherent input microwave signal.

\* \* \* \* \*